United States Patent
Brouwer

(10) Patent No.: US 9,157,535 B2
(45) Date of Patent: Oct. 13, 2015

(54) POSITIVE ISOLATION THROUGH ISOLATION OF AIR SUPPLY TO PNEUMATIC VALVES

(71) Applicant: FLUOR TECHNOLOGIES CORPORATION, Aliso Viejo, CA (US)

(72) Inventor: Buck Brouwer, Ursem (NL)

(73) Assignee: Fluor Technologies Corporation, Aliso Viejo, CA (US)

( * ) Notice: Subject to any disclaimer, the term of this patent is extended or adjusted under 35 U.S.C. 154(b) by 92 days.

(21) Appl. No.: 13/691,429

(22) Filed: Nov. 30, 2012

(65) Prior Publication Data

US 2014/0150885 A1 Jun. 5, 2014

(51) Int. Cl.
*F16K 11/10* (2006.01)

(52) U.S. Cl.
CPC ........... *F16K 11/10* (2013.01); *F15B 2211/329* (2013.01); *Y10T 137/0379* (2015.04); *Y10T 137/86928* (2015.04); *Y10T 137/87893* (2015.04); *Y10T 137/87917* (2015.04)

(58) Field of Classification Search
CPC .. F15B 2211/329; F15B 11/032; F17C 13/04; F16K 27/003; F16K 11/10; F16K 31/1221; Y10T 137/87917; Y10T 137/8778; Y10T 137/87893; Y10T 137/86928; Y10T 137/0379
USPC .................................. 137/613, 871, 885, 14
See application file for complete search history.

(56) References Cited

U.S. PATENT DOCUMENTS

| | | | |
|---|---|---|---|
| 3,018,794 A * | 1/1962 | Hoge ....................... | 137/596.16 |
| 4,554,942 A | 11/1985 | Williams et al. | |
| 6,073,655 A * | 6/2000 | Thompson et al. ........... | 137/885 |
| 6,176,262 B1 * | 1/2001 | Nimberger ..................... | 137/597 |
| 6,345,642 B1 * | 2/2002 | Yoshidome et al. .......... | 137/240 |
| 6,357,335 B1 | 3/2002 | Lafler et al. | |
| 6,802,242 B1 * | 10/2004 | Steinke et al. .................. | 91/454 |
| 7,568,909 B2 | 8/2009 | MacNutt et al. | |
| 2006/0254449 A1 | 11/2006 | Hisel | |
| 2007/0131282 A1 * | 6/2007 | Mohammed et al. ...... | 137/487.5 |
| 2007/0175395 A1 | 8/2007 | Oh | |
| 2010/0043889 A1 | 2/2010 | Taskar | |
| 2010/0059694 A1 | 3/2010 | Olander et al. | |
| 2011/0079010 A1 | 4/2011 | McBride et al. | |
| 2011/0094596 A1 | 4/2011 | Sugiyama et al. | |

FOREIGN PATENT DOCUMENTS

| JP | 4926711 | 5/2012 |
|---|---|---|
| WO | 2008/118450 | 10/2008 |
| WO | 2011/035296 | 3/2011 |

OTHER PUBLICATIONS

Fluid Power Society, "Pneumatic Technician Certification—Manual Including Study Guide, Solutions, & Pre-Tests", Manual # 405, Fluid Power Certification Board, 2002.
Metal Work Pneumatic, "Skillair Shut-Off Valve", advertisement Metal Work Pneumatic.

(Continued)

*Primary Examiner* — Kevin Lee
*Assistant Examiner* — Michael R Reid
(74) *Attorney, Agent, or Firm* — Fish & Tsang LLP

(57) ABSTRACT

Systems and methods are described for actuating a plurality of pneumatic valves to positively isolate one or more pieces of equipment. A manual valve can be disposed on a supply conduit that fluidly couples each of the pneumatic valves to a fluid supply source. To place the pneumatic valves in a safe position, the manual valve can be closed, which disrupts a flow of fluid from the source. Closing the manual valve can also open a drain conduit that allows the supply conduit to be depressurized.

19 Claims, 4 Drawing Sheets

(56) References Cited

OTHER PUBLICATIONS

Norgren, "Products for Safe Pneumatic Systems", brochure, IMI Norgren Limited, 1997.

Patent Cooperation Treaty, KIPO, "Notification of Trasnmiattal of the International Search Report and the Written Opinion of the International Searching Authority, or the Declaration", PCT Application No. PCT/US12/67472, issued Aug. 9, 2013.

* cited by examiner

POSITIVE ISOLATION THROUGH ISOLATION OF AIR SUPPLY TO PNEUMATIC VALVES

FIELD OF THE INVENTION

The field of the invention is safety systems and methods for use with pneumatic valves.

BACKGROUND

The following background discussion includes information that may be useful in understanding the present invention. It is not an admission that any of the information provided herein is prior art or relevant to the presently claimed invention, or that any publication specifically or implicitly referenced is prior art.

The use of pneumatic valves is common place across a wide variety of industries because they allow for remote operation of one or more valves typically through a computer-controlled system. Typically, pneumatic valves are configured to bias in an open or closed position, and actuate from the biased position to an opposite position when compressed air or other fluid is fed to the valve. To cause the valve to return to its biased position, the air or other fluid can be bled from the circuit uncoupling the pneumatic valve from the source of pressurized air or fluid.

To help prevent unintentional actuation of pneumatic valves or actuate multiple pneumatic valves simultaneously, it is known to use various electrically-operated valves that regulate flow of the compressed air or other fluid to the pneumatic valves. See, e.g., U.S. Pat. No. 7,568,909 to Mac-Nutt et al., U.S. pat. publ. no. 2006/0254449 to Hisel (publ. November 2006), U.S. pat. publ. no. 2007/0175395 to Oh (publ. August 2007), U.S. pat. publ. no. 2011/0094596 to Sugiyama et al. (publ. April 2011), WIPO publ. no. 2008/118450 to Boyle Energy Services & Technology, Inc. (publ. October 2008), and WIPO publ. no. 2011/035296 to Nordson Corp. (publ. March 2011).

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

However, the electrically-operated valves are not fully safe and can be problematic, as they are vulnerable to computer malfunctions and other issues, which could cause the pneumatic valves to be placed in a non-safe position. In addition, because the pneumatic valves can be actuated by a remote system, the pneumatic valves typically cannot be used as a means of positive isolation in a process.

Although it is known to utilize a hand-operated valve, a blind or a removable pipe spool to manually place a pneumatic valve in a safe position, such solution is time-consuming, especially in large processes that may include a plurality of pneumatic valves in various locations each having a hand-operated valve that must be actuated to place the system in a safe position.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Thus, there is still a need for systems and methods for positively isolating a plurality of pneumatic valves.

SUMMARY OF THE INVENTION

The inventive subject matter provides apparatus, systems and methods in which one can actuate a plurality of pneumatic valves using a single manually-operated valve. It is contemplated that the inventive subject matter can be applied in any process or installation where pneumatically-operated valves are used. The inventive subject matter beneficially reduces the amount of hardware required and chance for operator error than that of prior systems.

Each of the plurality of pneumatic valves can be fluidly coupled to a source of pressurized fluid via a supply conduit. The manual valve is preferably disposed along the conduit between the fluid source and the plurality of pneumatic valves. In this manner, closing of the manual valve can thereby isolate the plurality of pneumatic valves from the fluid source by shutting off flow of the fluid from the fluid source to the pneumatic valves.

In some contemplated embodiments, closing the manual valve can also cause fluid within the supply conduit to drain. This could be accomplished via a three way manual valve or a pneumatic valve fluidly coupled to the conduit that allows fluid to drain from the supply conduit in its safe position.

In one aspect, methods for actuating a plurality of pneumatic valves are contemplated where a manual valve is disposed intermediate between a plurality of pneumatic valves and a fluid source. Each of the pneumatic valves can be actuated to a safe position by closing the manual valve, which inhibits a flow of fluid from the fluid supply source to each of the pneumatic valves and depressurizes one or more supply conduits that fluidly couple the manual valve with the pneumatic valves.

Various objects, features, aspects and advantages of the inventive subject matter will become more apparent from the following detailed description of preferred embodiments, along with the accompanying drawing figures in which like numerals represent like components.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
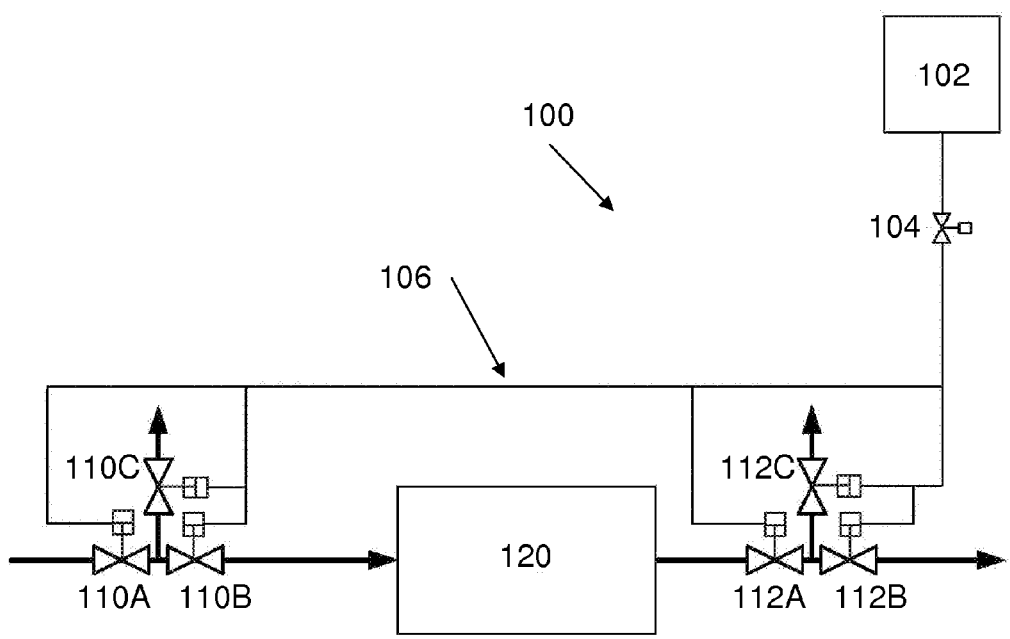
FIGS. 1-3 are schematics of various embodiments of systems for actuating a plurality of pneumatic valves.

FIG. 1 illustrates one embodiment of a system 100 for actuating a plurality of pneumatic valves 110A-110C and 112A-112C. A first valve 110A and a second valve 110B can be coupled to a fluid source 102 via supply conduit 106, such that a pressure of air or other fluid from the fluid source 102 causes the first and second pneumatic valves to actuate.

In the embodiment shown in FIG. 1, pneumatic valves 110A-110B and 112A-112B can be configured to be biased closed, and open only when supply conduit 106 is pressurized, while pneumatic valves 110C and 112C can be configured to be biased open, and thereby close only when the supply conduit 106 is pressurized. However, the specific biases of the valves can vary, and will depend on the specific application and the systems or equipment to be isolated. In other contemplated embodiments, some or all of the pneumatic valves can be non-biased.

System 100 includes a manual valve 104 that is disposed along the supply conduit 106, preferably between the fluid supply source 102 and the plurality of pneumatic valves 110A-110C and 112A-112C. It is especially preferred that the manual valve 104 is disposed remotely from the pneumatic valves 110A-110C and 112A-112C. By closing the manual valve 104, the pneumatic valves 110A-110C and 112A-112C can be isolated from the fluid supply source 102 and returned to their respective biased positions.

The use of a manual valve prevents remote operation of the pneumatic valves and ensures that the pneumatic valves remain in a safe position. In addition, system 100 allows for multiple pneumatic valves 110A-110C and 112A-112C in a single system that share a common supply of air or other fluid to operate can be sent to a safe position with a single action (e.g., closure of the manual valve 104). This improvement over prior art systems advantageously reduces the number of operator actions required to place the pneumatic valves in a safe position and reduces the chance of misoperation. The use of manual valve 104 helps to improve safety of the system 100 and can significantly reduce the time required to place the pneumatic valves in a safe position, especially for complex systems where multiple lines need to be isolated on a regular basis. Thus, rather than including a manual valve on each of the pneumatic valves, the use of manual valve 104 allows for the pneumatic valves to be placed in a safe position without requiring an operator to visit each of the valves. This is particularly useful where the pneumatic valves may be located on different floors from the equipment to be isolated, located out of reach of a platform, or otherwise difficult to access.

Finally, the use of manual valve 104 also allows for low-cost retrofitting of existing plants and systems by simply adding manual valve 104 between an air supply source and the pneumatic valves to be controlled.

In some contemplated embodiments, the manual valve 104 can comprise a key-lock device, although any commercially suitable valves could be used. Although shown as a two-way valve, it is contemplated that the manual valve could be a three-way valve such that actuation of the manual valve 104 shuts off fluid flow from the fluid supply 102 to the pneumatic valves 110A-110C and 112A-112C and drains fluid within the supply conduit 106. An example valve is the shut-off valve model no. V3V 100 offered for sale by Skillair®.

As shown in FIG. 1, pneumatic valves 110A-110C and pneumatic valves 112A-112C can be respectively disposed upstream and downstream of a piece of equipment 120. By closing the manual valve 104, the pneumatic valves 110A-110B and 112A-112B can be closed to thereby positively isolate the piece of equipment 120 from the system 100. In such embodiments, valves 110C and 112C can be opened by closing the manual valve 104 to thereby bleed to conduit that fluidly couples the piece of equipment 120 to system 100. Exemplary equipment can include, for example, a polysilicon or other reactors, gas scrubbing equipment, and other industrial equipment.

In other contemplated embodiments, system 100 can include a block and bleed manifold that includes at least some of the plurality of pneumatic valves.

To reopen the pneumatic valves 110A-110B and 112A-112B and place system 100 in a normal operation, the manual valve 104 must first be actuated to an open position to allow a flow of fluid from source 102, which in turn allows for subsequent actuation of the pneumatic valves 110A-110B and 112A-112B.

Figure 2:
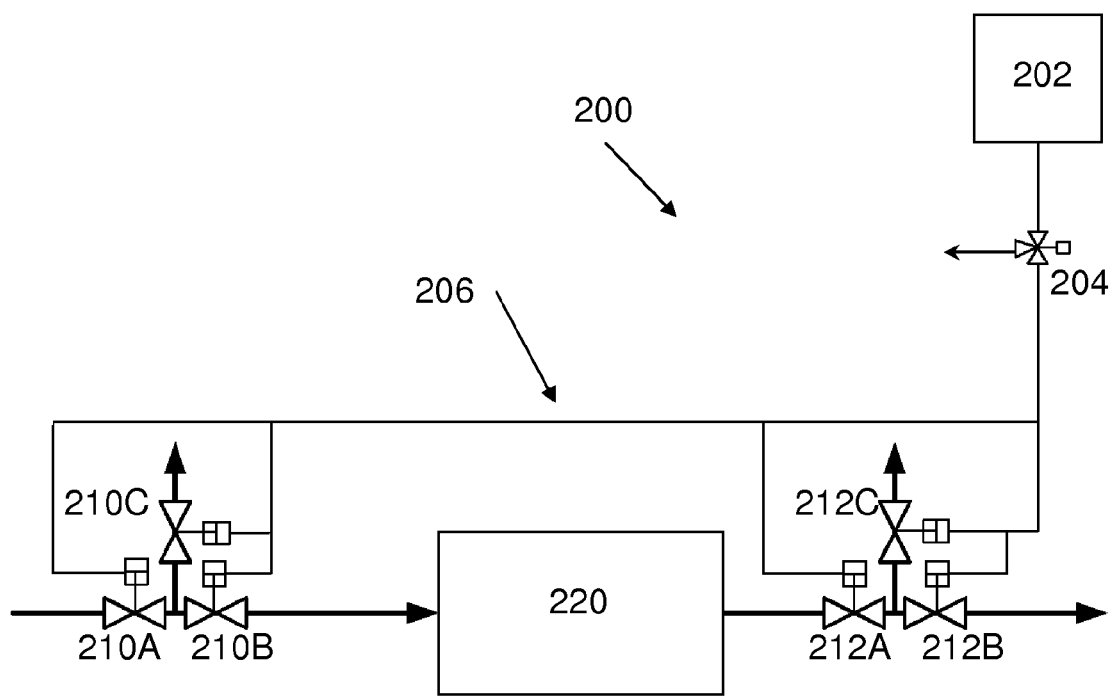

FIG. 2 illustrates another embodiment of a system 200 for actuating a plurality of pneumatic valves 210A-210C and 212A-212C respectively disposed upstream and downstream of a piece of equipment 220. The system 200 preferably includes a manual valve 204 that is coupled to the air supply source 202. The manual valve 204 can be disposed between the air supply source 202 and each of the plurality of pneumatic valves 210A-210C and 212A-212C and configured such that closing the manual valve 204 isolates each of the plurality of pneumatic valves 210A-210C and 212A-212C from the air supply source 202, and shuts off fluid flow from the air supply source 202 to the pneumatic valves 210A-210C and 212A-212C.

It is especially preferred that the manual valve be configured to drain fluid from a supply line 206 between the manual valve 204 and the plurality of pneumatic valves 210A-210C and 212A-212 when the manual valve 204 is closed. In one exemplary embodiment, the manual valve 204 can comprise a three-way valve, such as a ball valve, such that rotating the valve 204 stops fluid flow in a first direction, and allows for fluid flow in a second direction. With respect to the remaining numerals in FIG. 2, the same considerations for like components with like numerals of FIG. 1 apply.

Figure 3:
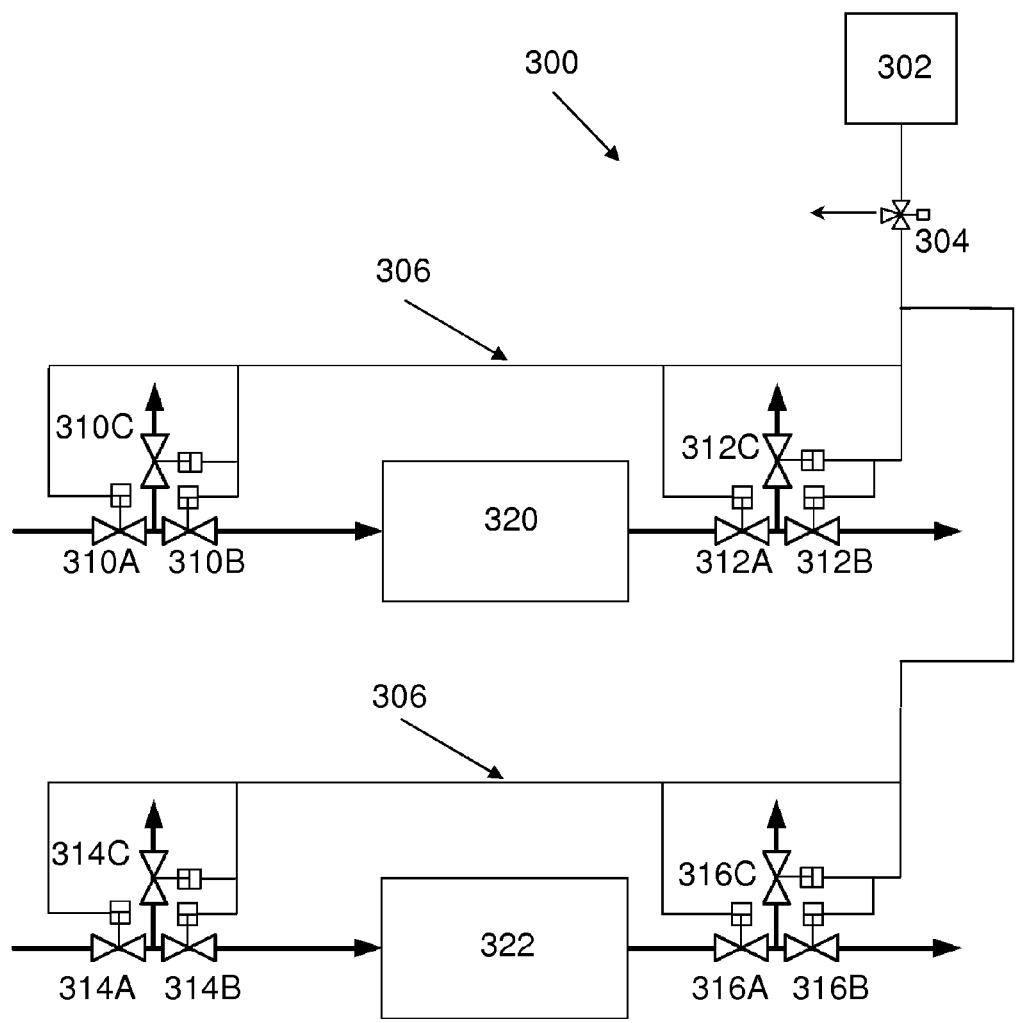

FIG. 3 illustrates yet another embodiment of system 300 that includes a manual valve 304 coupled to an air supply conduit 306. Closing of the manual valve advantageously stops the flow of air from air supply source 302, and depressurizes conduit 306. In this manner, closure of the manual valve 304 can quickly and easily bring a plurality of pneumatic valves 310A-310C, 312A-312C, 314A-314C, and 316A-316C to a safe position, without requiring closure of manual valves at each of the plurality of pneumatic valves. Such action also allows for positive isolation of various pieces of equipment 320 and 322, which increases technician safety during repair, maintenance and/or replacement of the equipment. With respect to the remaining numerals in FIG. 3, the same considerations for like components with like numerals of FIG. 1 apply.

Figure 4:
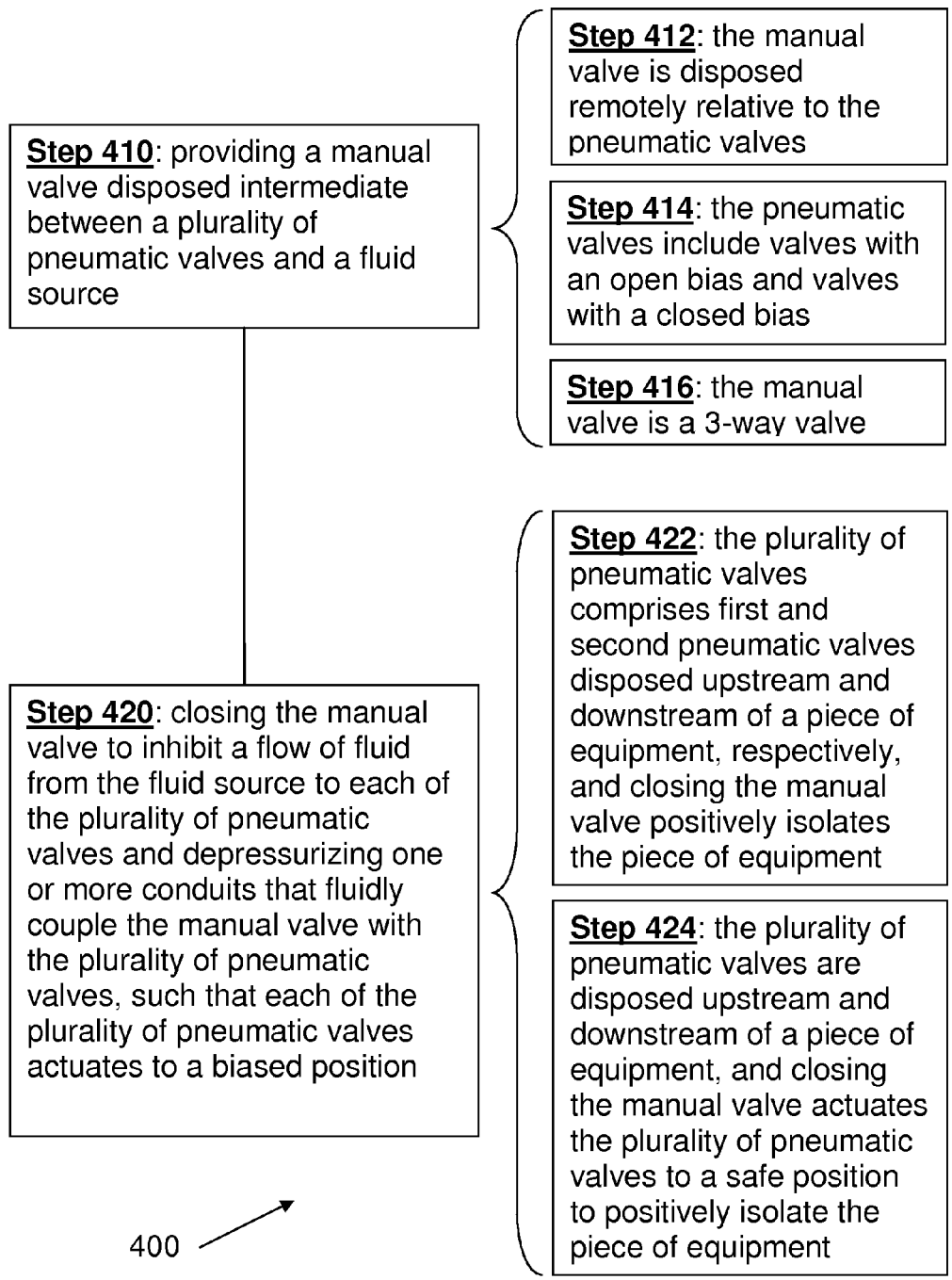
FIG. 4 is a flowchart of a method for actuating a plurality of pneumatic valves.

FIG. 4 illustrates a method 400 for actuating a plurality of pneumatic valves. Method 400 can include step 410 of providing a manual valve disposed intermediate between a plurality of pneumatic valves and a fluid source, which could store air or other pressurized fluids. In step 412, the manual valve is preferably disposed remotely relative to some or all of the pneumatic valves. In some contemplated embodiments shown in step 416, the manual valve can comprise a 3-way valve, although any commercially suitable valves could be used including, for example, a 2-way valve, two 2-way valves, and so forth. The specific valve(s) chosen will likely depend on the specific application and configuration of the pneumatic system.

It is contemplated in step 414 that the plurality of pneumatic valves can include some valves that are biased in an open position and some valves that are biased in a closed position. Other contemplated embodiments can also include valves without a bias, or a plurality of valves all of which are biased open or closed depending on the specific application.

In step 420, the manual valve can be closed to inhibit a flow of fluid from the fluid source to each of the plurality of pneumatic valves fluidly coupled to that fluid source. Additionally, closure of the manual valve preferably depressurizes one or more conduits that fluidly couple the manual valve with the plurality of pneumatic valves, such that each of the plurality of pneumatic valves actuates to a safe position.

In step 422, the plurality of pneumatic valves includes a first and second pneumatic valve disposed upstream and downstream of a piece of equipment, respectively, such that closure of the manual valve closes the first and second pneumatic valves and thereby positively isolates the piece of equipment. This is critical where the piece of equipment requires maintenance or replacement because the positive isolation of the equipment ensures a technician's safety by preventing undesired and unintentional flow of fluid to the equipment, for example.

In step 424, the plurality of pneumatic valves are disposed upstream and downstream of a piece of equipment, such that closing the manual valve actuates the plurality of pneumatic valves to a safe position to positively isolate one or more systems or pieces of equipment.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A system for actuating a plurality of pneumatic valves, comprising:
   first and second pneumatic valves coupled to a fluid source via a supply conduit, such that pressure of fluid from the fluid source causes the first and second pneumatic valves to open;
   third and fourth pneumatic valves coupled to the fluid source via the supply conduit, wherein the first and second pneumatic valves are disposed upstream of a piece of equipment, and the third and fourth pneumatic valves are disposed downstream of the piece of equipment;
   a manual valve coupled to the supply conduit between the fluid source and the first, second, third and fourth pneumatic valves, and configured such that closing the manual valve (a) isolates the first, second, third and fourth pneumatic valves from the fluid source, (b) shuts off a flow of the fluid from the fluid source to the first, second, third and fourth pneumatic valves, and (c) causes the first, second, third, and fourth pneumatic valves to close and positively isolate the piece of equipment from a process fluid, wherein the process fluid and fluid from the fluid source are in distinct circuits; and
   a fifth pneumatic valve coupled to the fluid source via the supply conduit, wherein the manual valve is configured such that closing the manual valve causes the fifth pneumatic valve to open.

2. The system of claim 1, wherein the manual valve comprises a key-lock device.

3. The system of claim 1, wherein the manual valve comprises a three-way valve, and wherein closing the manual valve drains the fluid from the supply conduit between the manual valve and the first and second pneumatic valves.

4. The system of claim 1, wherein the manual valve is disposed remotely relative to each of the first and second pneumatic valves.

5. The system of claim 1, wherein the fifth pneumatic valve is biased open, and wherein the pressure of the fluid from the fluid source causes the fifth pneumatic valve to close.

6. The system of claim 1, wherein the fluid source comprises air.

7. The system of claim 1, wherein the pressure of the fluid from the fluid source causes the third and fourth pneumatic valves to open.

8. The system of claim 1, wherein at least one of the third and fourth pneumatic valves is biased closed, and wherein the pressure of the fluid from the fluid source causes the at least one of the third and fourth pneumatic valves to open.

9. The system of claim 1, wherein the manual valve is disposed adjacent to the fluid source.

10. A system for actuating a plurality of pneumatic valves, comprising:
    a plurality of pneumatic valves, each of which is coupled to a fluid source, such that pressure of fluid from the fluid source causes the pneumatic valves to open or close, wherein the plurality of pneumatic valves comprises first and second pneumatic valves disposed upstream and downstream of a piece of equipment, respectively;
    a manual valve fluidly coupled to the fluid source and the first and second pneumatic valves, wherein the manual valve is disposed between the fluid source and each of the first and second pneumatic valves and configured such that closing the manual valve (a) isolates each of the first and second pneumatic valves from the fluid source, (b) shuts off a flow of the fluid from the fluid source to the first and second pneumatic valves, (c) drains fluid from a supply line between the manual valve and the first and second pneumatic valves, and (d) causes the first and second pneumatic valves to close and positively isolate the piece of equipment from a process fluid, wherein the process fluid and fluid from the fluid source reside in distinct circuits; and a third pneumatic valve, from the plurality of pneumatic valves, coupled to the fluid source, wherein the manual valve is configured such that closing the manual valve causes the third pneumatic valve to open.

11. The system of claim 10, wherein the manual valve is disposed remotely relative to the plurality of pneumatic valves.

12. The system of claim 10, wherein the manual valve comprises a key-lock device.

13. The system of claim 12, wherein at least one of the first and second pneumatic valves is biased closed, and wherein the pressure of the fluid from the fluid source causes the at least one of the first and second valves to open.

14. A method for actuating a plurality of pneumatic valves, comprising:

providing a manual valve disposed intermediate between a plurality of pneumatic valves and a fluid source, wherein the plurality of pneumatic valves comprises a first and second pneumatic valve disposed upstream and downstream of a piece of equipment, respectively;

closing the manual valve (i) causes the first and second pneumatic valves to close and positively isolate a piece of equipment from a process fluid, and (ii) causes a third pneumatic valve from the plurality of pneumatic valves, to open, wherein the process fluid and fluid from the fluid source are in distinct circuits; and wherein the step of closing the manual valve inhibits a flow of fluid from the fluid source to each of the plurality of pneumatic valves and depressurizing one or more conduits that fluidly couple the manual valve with the plurality of pneumatic valves, such that each of the plurality of pneumatic valves actuates to a safe position, wherein the manual valve is disposed adjacent to the fluid source.

15. The method of claim 14, wherein at least one of the first and second pneumatic valves is biased closed, and wherein the pressure of the fluid from the fluid source causes the at least one of the first and second valves to open.

16. The method of claim 14, wherein the manual valve is disposed remotely relative to the plurality of pneumatic valves.

17. The method of claim 14, wherein the manual valve comprises a key-lock device.

18. The method of claim 14, wherein the fluid source comprises air.

19. The method of claim 14, wherein the manual valve comprises a three-way valve.

* * * * *